(12) United States Patent
Robertson et al.

(10) Patent No.: US 8,621,873 B2
(45) Date of Patent: Jan. 7, 2014

(54) MOBILE PLATFORM SYSTEM FOR A GAS TURBINE ENGINE

(75) Inventors: Jason Michael Robertson, San Diego, CA (US); Ian Trevor Brown, Tauranga (NZ); Steven Gastelum, El Cajon, CA (US); Daniel James Doll, Poway, CA (US); John Raymond Hawley, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 1301 days.

(21) Appl. No.: 12/318,400

(22) Filed: Dec. 29, 2008

(65) Prior Publication Data

US 2010/0162726 A1 Jul. 1, 2010

(51) Int. Cl.
*F02C 7/20* (2006.01)

(52) U.S. Cl.
USPC .............................. 60/796; 248/649; 248/678

(58) Field of Classification Search
USPC ............ 60/772, 796, 797, 798; 248/649, 651, 248/659, 678
See application file for complete search history.

(56) References Cited

U.S. PATENT DOCUMENTS

| | | | |
|---|---|---|---|
| 2,443,054 A | 6/1948 | Putz et al. | |
| 2,839,894 A | 6/1958 | Shutts et al. | |
| 3,556,672 A | 1/1971 | Gentile | |
| 4,440,265 A | 4/1984 | Spagnoli | |
| 4,593,526 A * | 6/1986 | Pankowiecki | 60/657 |
| 4,804,162 A * | 2/1989 | Rice | 248/671 |
| 5,271,218 A | 12/1993 | Taylor | |
| 5,870,824 A | 2/1999 | Lilja et al. | |
| 6,230,481 B1 | 5/2001 | Jahr | |
| 6,279,309 B1 | 8/2001 | Lawlor et al. | |
| 6,449,957 B1 | 9/2002 | Takamatsu et al. | |
| 6,450,782 B1 | 9/2002 | Sakamoto | |
| 6,793,458 B2 | 9/2004 | Kawai et al. | |
| 7,082,896 B2 | 8/2006 | Allen et al. | |
| 7,103,952 B2 | 9/2006 | Appleton et al. | |
| 7,143,585 B2 | 12/2006 | Kuroki et al. | |
| 2008/0011932 A1 | 1/2008 | Stretton | |

* cited by examiner

*Primary Examiner* — Phutthiwat Wongwian
*Assistant Examiner* — Vikansha Dwivedi
(74) *Attorney, Agent, or Firm* — Finnegan, Henderson, Farabow, Garrett & Dunner LLP

(57) ABSTRACT

A system for moving an auxiliary component of a gas turbine engine is disclosed. The system may have a mobile support platform configured to support the auxiliary component during operation of the gas turbine engine. The system may further have at least one guide assembly operably connected to the mobile support platform and configured to guide movement of the mobile support platform. The system may also have a drive assembly operably connected to the mobile support platform and configured to impart movement of the mobile support platform between an elevated position and a lowered position.

29 Claims, 5 Drawing Sheets

MOBILE PLATFORM SYSTEM FOR A GAS TURBINE ENGINE

TECHNICAL FIELD

The present disclosure relates generally to a mobile platform system and, more particularly, to a mobile platform system for movably supporting an auxiliary component of a gas turbine engine.

BACKGROUND

Many power systems include a gas turbine engine ("GTE") and a power load assembly. The GTE typically includes a compressor section, a combustor section, and a turbine section. The power load assembly is driven by the GTE and is known to include, for example, a pump, a compressor, or an electric generator. Various configurations of support systems are employed to support the GTE and the power load assembly. In some such power systems, the GTE and the power load assembly are both mounted to a common, stationary support structure.

Such a stationary support structure may make replacing or repairing the power system difficult. Removing the GTE from the stationary support structure may involve unfastening the GTE from numerous fixed mounts, which may require considerable time and effort. Additionally, many repair operations may involve separating sections of the GTE from one another, which may require removing the GTE from the stationary support structure. For example, replacing a damaged section of the GTE may require removing the GTE from the stationary support structure, separating the damaged section from the other sections, installing a replacement section, and reassembling the sections of the GTE.

The power system may also include one or more auxiliary components (e.g., a gas fuel module or a liquid fuel module) to facilitate operation of the GTE and power load assembly. It is known to mount the auxiliary components on the stationary support structure. Unfortunately, mounting such auxiliary components in some locations on the stationary support structure may obstruct servicing the auxiliary component and/or other components of the power system.

One example of a power system including a GTE and an auxiliary component mounted on a stationary support structure is described in U.S. Pat. No. 6,230,481 (the '481 patent) to Jahr. The '481 patent includes an operating and control system mounted within an internal chamber of a base frame on a sliding module. The module can move between a stored position within the internal chamber of the base frame and a service position outside of the internal chamber of the base frame. In the stored position, the operating and control system may be protected from damage from above by plates of the base frame and may be protected from the side by a pivoting side door. Additionally, the operating and control system is ventilated with an external ventilation device. When the operating and control system requires maintenance or inspection, the operating and control system can move horizontally from the stored position within the internal chamber to the service position outside of the internal chamber.

Although the system of '481 patent allows for horizontal sliding of the operating and control system on the module, certain disadvantages may persist. The system of '481 may be inefficient because inspection of the operating and control system may be undesirably labor intensive. The system of the '481 patent may be expensive and overly complex because employment of the external ventilation system may undesirably increase the cost of the system.

The disclosed mobile platform system is directed to overcoming one or more of the problems set forth above and/or other problems in existing technology.

SUMMARY

In one aspect, the present disclosure is directed to a system for moving an auxiliary component of a gas turbine engine. The system may include a mobile support platform configured to support the auxiliary component during operation of the gas turbine engine. The system may further include at least one guide assembly operably connected to the mobile support platform and configured to guide movement of the mobile support platform. The system may also include a drive assembly operably connected to the mobile support platform and configured to impart movement of the mobile support platform between an elevated position and a lowered position.

In another aspect, the present disclosure is directed to a method of moving one or more sections of a gas turbine engine. The method may include the step of moving an auxiliary component supported on a mobile support platform between a first position and a second position. The auxiliary component may at least partially occupy a first space when in the first position. The method may further include the step of moving the one or more sections of the gas turbine engine into the first space when the auxiliary component is in the second position.

DETAILED DESCRIPTION

Figure 1:
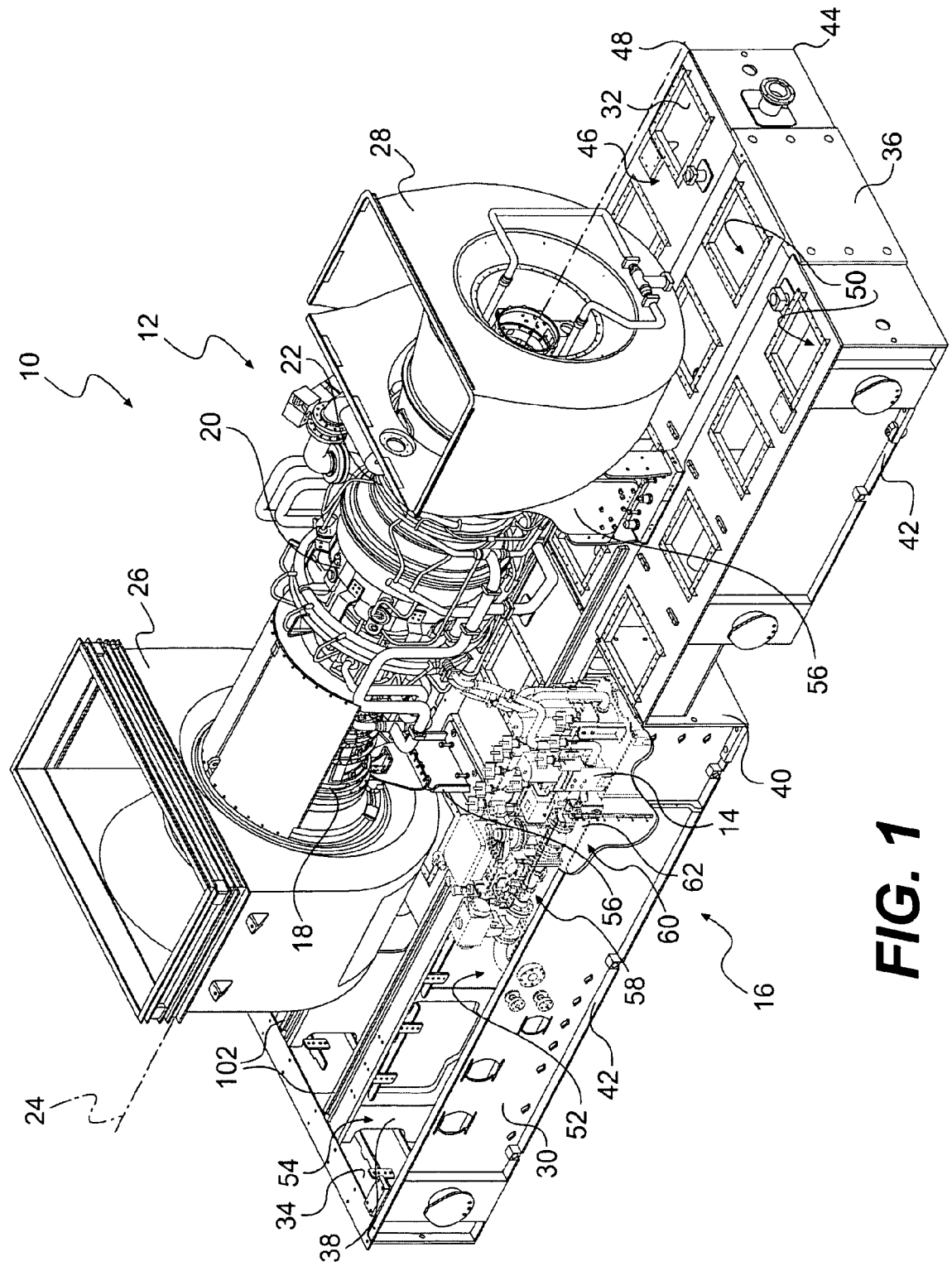
FIG. 1 shows an exemplary power system according to the present disclosure, including a GTE mounted on a primary support structure and an auxiliary component mounted on a mobile platform system in a first position.

FIG. 1 illustrates a power system 10. For providing power to a power load assembly (not shown), power system 10 may include a gas turbine engine ("GTE") 12 and one or more auxiliary components, including an auxiliary component 14. GTE 12 and auxiliary component 14 may be mounted on a support structure, for example, a primary support structure 16. GTE 12 may include a plurality of sections including a compressor section 18, a combustor section 20, and a turbine section 22, each aligned during operation on primary support structure 16 along a longitudinal axis 24. Compressor section 18 may be configured to draw air into GTE 12 through an air inlet duct 26 and compress the air before it enters combustor section 20. The compressed air from compressor section 18 may be mixed with fuel and ignited in combustor section 20. The resulting high pressure combustion gas generated by compressor section 18 may be sent through turbine section 22 to rotate turbine rotors (not shown) coupled to an output shaft (not shown) to provide rotational energy to the power load assembly. The combustion gas may then be exhausted from turbine section 22 and expelled to the atmosphere via exhaust collector box 28.

Primary support structure 16 may include a first side wall 30, a second side wall 32, a first end wall 34, and a second end wall 36. Walls 30, 32, 34, 36 may define an exterior frame of primary support structure 16. Primary support structure 16 may also include one or more internal walls to provide additional structural reinforcement. It is contemplated that the one or more internal walls may include, for example, a longitudinal internal wall 38 and a lateral internal wall 40. Primary support structure 16 may also include a lower plane extending over a lower end 44 of primary support structure 16. A lower deck 42 may extend substantially along the lower plane and cover the entire lower end 44 of primary support structure 16 or may include openings. Primary support structure 16 may also include an upper plane extending over an upper end 48 of primary support structure 16. An upper deck 46 may extend substantially along the upper plane, for example, from first side wall 30 to second side wall 32 and from first end wall 34 to second end wall 36. Upper deck 46 may be formed by any number of plates and may also include one or more openings to access one or more internal chambers 50 of primary support structure 16. For example, primary support structure 16 may include an auxiliary component chamber 52 to house one or more auxiliary components 14. Auxiliary component chamber 52 may be at least partially enclosed by a plurality of walls (e.g., walls 30, 34, 38, 40, and lower deck 42), with a chamber opening 54 providing access to auxiliary component chamber 52.

Primary support structure 16 may provide a structural base for supporting power system 10. For example, primary support structure 16 may include one or more GTE support brackets 56 to support compressor section 18, combustor section 20, and turbine section 22. GTE support brackets 56 may be mounted to upper deck 46 of primary support structure 16. During operation of GTE 12, GTE support brackets 56 may support GTE 12 in a substantially horizontal position and maintain alignment of compressor section 18, combustor section 20, and turbine section 22 along longitudinal axis 24.

Auxiliary component 14 may be any type of component serving an ancillary role in operation of power system 10. In other words, auxiliary component 14 may be any type of component serving the compressor section 18, combustor section 20, or turbine section 22. For example, auxiliary component 14 may be a gas fuel module 58 or a liquid fuel module (not shown) for regulating fuel to combustor section 20. Although only gas fuel module 58 is described in detail, any number or type of auxiliary components 14 may be utilized by power system 10.

Figure 2:
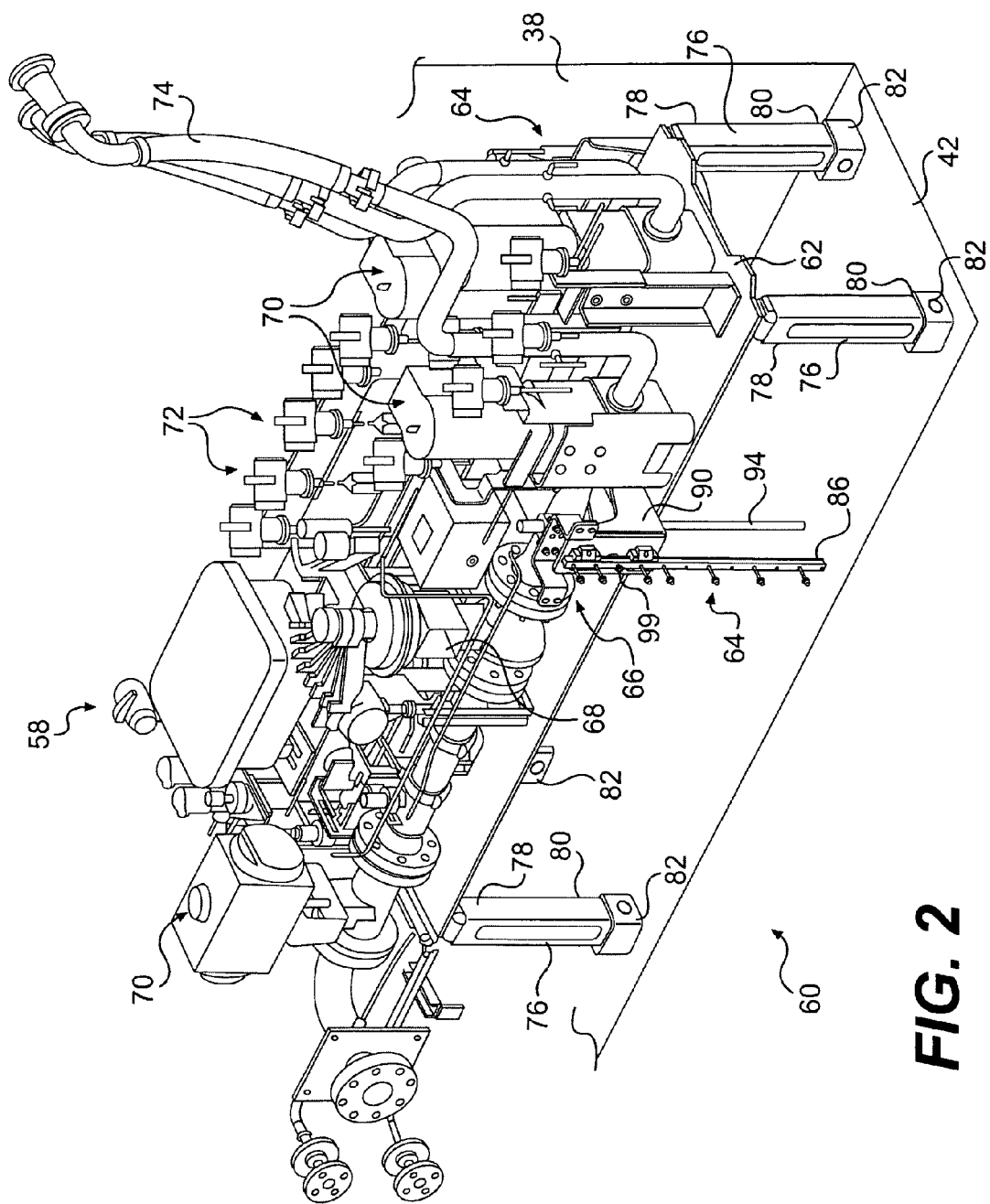
FIG. 2 shows the auxiliary component and the mobile platform system of FIG. 1 in greater detail.
Figure 3:
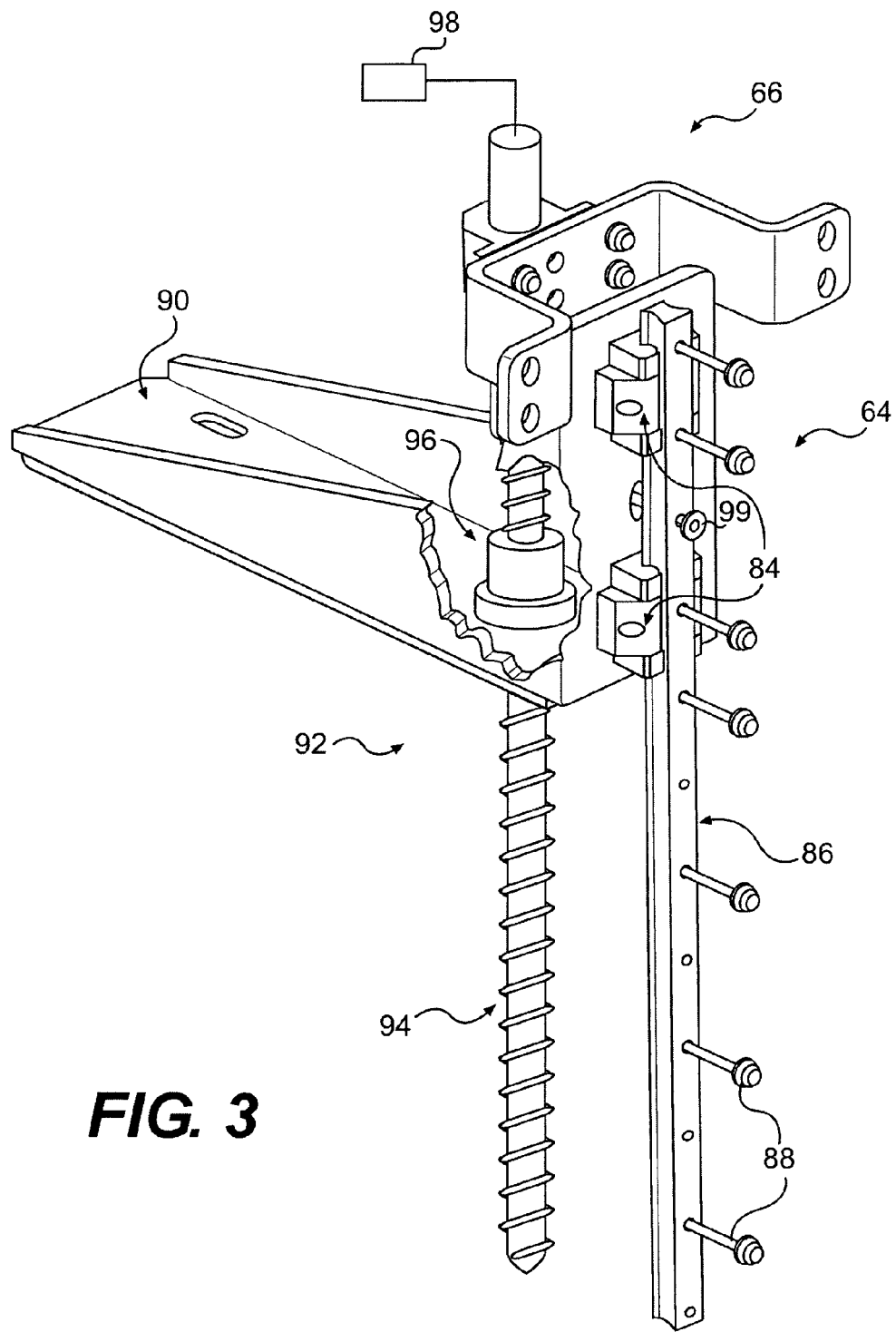
FIG. 3 shows an exemplary guide assembly and an exemplary drive assembly of the mobile platform system illustrated in FIG. 2.

As illustrated in the cut-away portion of FIG. 1 and shown in detail in FIG. 2, primary support structure 16 may include a mobile platform system 60 having a mobile support platform 62, a guide assembly 64, and a drive assembly 66 (best shown in FIG. 3). Gas fuel module 58 may be mounted on mobile support platform 62 and may include one or more subcomponents for supplying and regulating fuel to GTE 12, including, for example, a pump 68, valves 70, gauges 72, and fuel conduits 74. Although not shown, gas fuel module 58 may also include a controller having one or more sensors (e.g., a flow sensor and a pressure sensor) for controlling the flow of fuel to GTE 12. As discussed in more detail below, mobile platform system 60 may allow supporting gas fuel module 58 in an elevated, first position shown in FIG. 1, as well as supporting gas fuel module 58 in a lowered second position shown in FIG. 4.

In order to show details of mobile platform system 60, FIG. 2 is shown with parts of primary support structure 16 omitted. With gas fuel module 58 elevated in the first position, mobile support platform 62 and gas fuel module 58 may be at least partially supported via one or more temporary supports, for example, support legs 76. Each support leg 76 may include a first end 78, which may be attached to mobile support platform 62 by one or more fasteners (not shown), and a second end 80 attached to lower deck 42 via a pivot bracket 82. Each pivot bracket 82 may, for example, be attached to lower deck 42 via a fastener (not shown) and attached to a corresponding support leg 76 by a fastener (not shown). Each pivot bracket 82 may permit rotational movement of the support leg 76 relative to lower deck 42. In lieu of pivot brackets 82, second end 80 of each support leg 76 may rest on lower deck 42 without a fixed or rotational connection.

Figure 4:
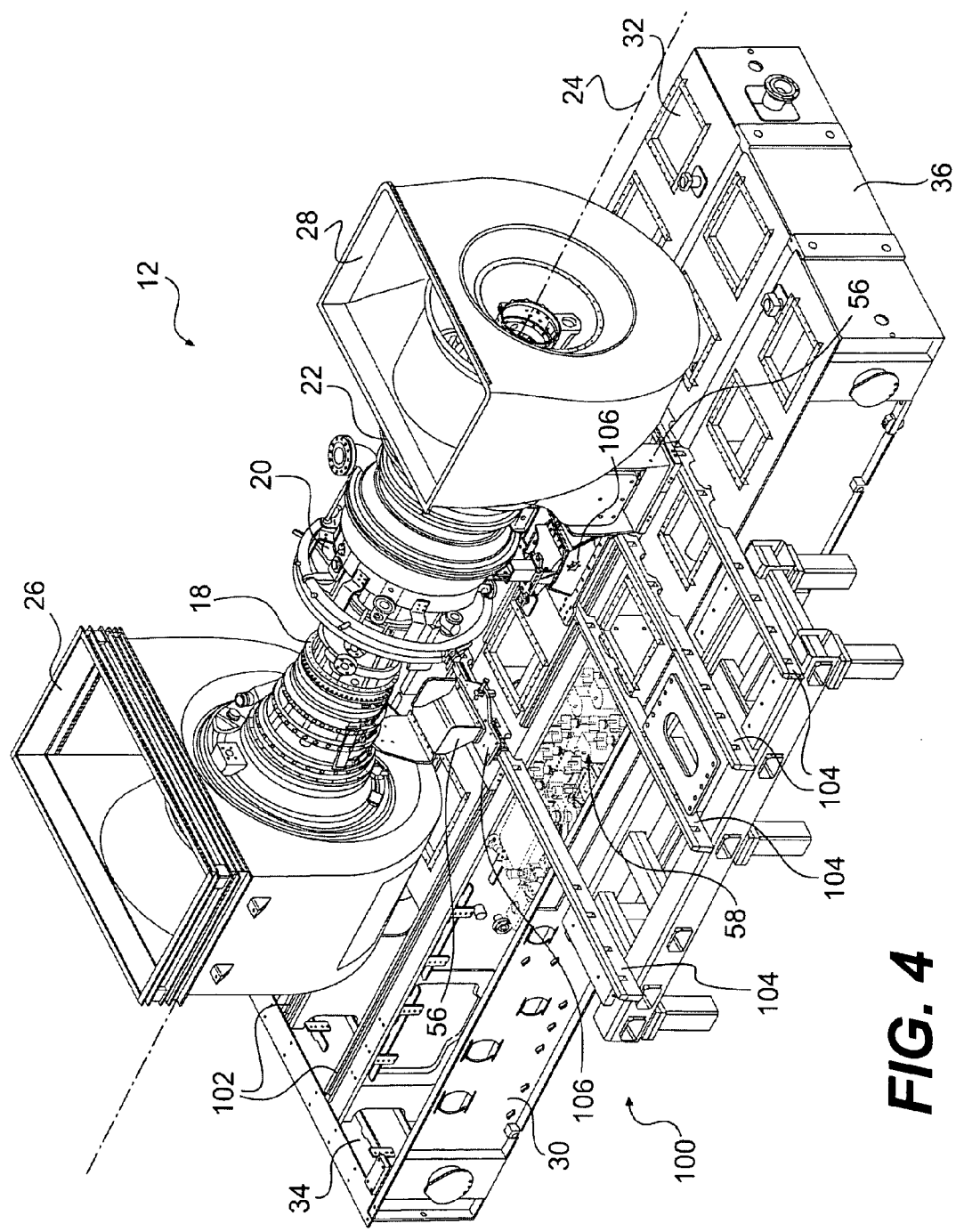
FIG. 4 shows the exemplary power system illustrated in FIG. 1 with the auxiliary component supported in a second position by the mobile platform system.

As illustrated in FIG. 3, mobile support platform 62 may include one or more guide assemblies 64 for guiding movement of mobile support platform 62 between the first position (FIG. 1) and the second position (FIG. 4). Each guide assembly 64 may include one or more platform sliders 84 traveling along a corresponding platform guide rail 86. It is contemplated that each guide assembly 64 may include two platform sliders 84 associated with each platform guide rail 86. Each platform guide rail 86 may be oriented in a substantially vertical orientation and mounted to primary support structure 16, for example, along longitudinal internal wall 38 or an interior facing surface of first side wall 30 via one or more fasteners 88. Platform sliders 84 may be attached to mobile support platform 62, for example, via a mounting bracket 90 with one or more fasteners (not shown). In the exemplary embodiment, three guide assemblies 64 may be mounted to primary support structure 16 (e.g., within auxiliary component chamber 52) to guide movement of mobile support platform 62. For example, two guide assemblies 64 may be attached to longitudinal internal wall 38 and a single guide assembly 64 may be attached to first side wall 30. It is contemplated that any number of guide assemblies 64 sufficient to support one or more auxiliary components 14 may be utilized. Further, each guide assembly 64 may include any combination and/or orientation of platform sliders 84 and platform guide rails 86.

Each guide assembly 64 may include mating geometry between its platform sliders 84 and platform guide rails 86. For example, as shown in FIG. 3, each platform guide rail 86 may include a substantially T-shape cross section. In order to mate with T-shaped platform guide rails 86, platform sliders 84 may be substantially C-shaped in cross section. Mating geometry between platform sliders 84 and platform guide rails 86 may aid in guiding mobile support platform 62 between the first position (FIG. 1) and the second position (FIG. 4). Although C-shaped platform sliders 84 and T-shaped platform guide rails 86 are described and shown, any known geometry of mating rails and sliders may be implemented to guide movement of mobile support platform 62.

One or more of guide assemblies 64 may also include drive assembly 66 to facilitate movement of mobile support platform 62 between the first position (FIG. 1) and the second position (FIG. 4). Drive assembly 66 may include a lifting mechanism including, for example, a ball screw jack 92 or a scissor jack (not shown). In the exemplary embodiment, one of the three guide assemblies 64 may include a ball screw jack 92 (FIG. 3). It is contemplated that ball screw jack 92 may include a threaded shaft 94 and a traveler 96. An actuator 98 may rotate threaded shaft 94 to move traveler 96 in a direction of the axis of threaded shaft 94. Traveler 96 may be attached to mounting bracket 90, thereby imparting movement of mobile support platform 62 between the first position (FIG. 1) and the second position (FIG. 4). Actuator 98 may be manually powered, for example, via a handle. Alternatively, actuator 98 may be powered by machinery, for example by an electrical actuator, a hydraulic actuator, or a pneumatic actuator. It is contemplated that one or more guide assemblies 64 may include a safety pin 99 removably positioned through guide rail 86 and into mounting bracket 90 to reduce the likelihood that mobile platform 60 may inadvertently move.

Referring to FIG. 4, primary support structure 16 may also include a temporary support structure for use during service, for example, a secondary support structure 100 that may be positioned adjacent either first or second side walls 30, 32. FIG. 4 shows secondary support structure 100 positioned adjacent first side wall 30. Primary support structure 16 may also include one or more longitudinal GTE guide rails 102 and one or more lateral GTE guide rails 104. One or more GTE sliders 106 may be mounted to GTE 12, for example, beneath GTE support brackets 56 to permit movement of GTE 12 in a substantially longitudinal direction along corresponding longitudinal GTE guide rails 102 and/or in substantially lateral direction along corresponding lateral GTE guide rails 104. That is, GTE sliders 106 may be added below support brackets 56 when it is desired to move GTE 12. It is contemplated that one or more sections of GTE 12 may be moved on lateral GTE guide rails 104 from a first GTE position (FIG. 4) supported on primary support structure 16 to a second GTE position (FIG. 5) supported on secondary support structure 100. GTE sliders 106 may include rollers to assist movement of the more or more sections of GTE 12.

Industrial Applicability

The disclosed mobile platform system may be applicable to any power system where moveably supporting an auxiliary component may prove advantageous. The disclosed mobile platform system may permit moving the auxiliary component from a first position to a second position, such as to provide clearance for moving one or more other components of the power system.

Primary support structure 16 may include various features that permit GTE 12 and auxiliary component 14 to share physical space on primary support structure 16. For example, in some circumstances, power system 10 may be arranged on primary support structure 16 in an operating configuration with auxiliary component 14 elevated in the first position (FIG. 1) at least partially above upper deck 46 of primary support structure 16, and each section (e.g., compressor section 18, combustor section 20, and turbine section 22) of GTE 12 may be positioned generally in the middle of primary support structure 16 between first and second side walls 30 and 32. In other circumstances, power system 10 may be arranged on primary support structure 16 in a GTE service configuration (FIG. 4) with auxiliary component 14 lowered in the second position at least partially below upper deck 46 of primary support structure 16, and at least one section of GTE 12 may be offset from its position in the operating configuration in a lateral direction relative to longitudinal axis 24. In other words, it is contemplated that auxiliary component may not be entirely below upper deck 46 while permitting at least one section of GTE 12 to pass over auxiliary component 14. Hence, in the GTE service configuration, GTE 12 may at least temporarily occupy space previously occupied by gas fuel module 58.

As shown in FIG. 1, arranging power system 10 in the operating configuration with gas fuel module 58 elevated in the first position may permit efficient inspection and ventilation of the gas fuel module 58. When elevated in the first position, gas fuel module 58 may be at least partially above upper deck 46 of primary support structure 16. Therefore, when gas fuel module 58 is in the first position, an operator may readily inspect one or more of the subcomponents (e.g., gauges 72) of gas fuel module 58. Further, supporting gas fuel module 58 in the first position may promote natural ventilation of gas fuel module 58.

When supported in the first position by guide assemblies 64 and support legs 76, gas fuel module 58 may extend at least partially above upper deck 46 of primary support structure 16. In the elevated position (FIG. 1), gas fuel module 58 may obstruct movement of one or more sections of GTE 12 in a direction lateral to longitudinal axis 24. For example, as shown in FIG. 1, gas fuel module 58 may obstruct lateral movement of combustor section 20 in a direction toward first side wall 30.

As shown in FIG. 4, gas fuel module 58 may be moved from the elevated, first position to the lowered, second position to provide vertical clearance for lateral movement of one more sections of GTE 12. Prior to initiating movement of gas fuel module 58, one or more mechanical and/or electrical connections between GTE 12 and gas fuel module 58 may be disconnected. For example, fuel conduits 74 may be disconnected from combustor section 20. It is contemplated that safety pin 99 may be removed from platform guide rail 86 to permit movement of gas fuel module 58. Furthermore, drive assembly 66 may be implemented to slightly raise mobile support platform 62 to reduce the load on each support leg 76. Subsequently, each support leg 76 may be disconnected from mobile support platform 62 and pivoted down toward lower deck 42 such that first end 78 may be adjacent lower deck 42, or each support leg 76 may otherwise be moved from a vertical orientation to horizontal orientation so as not to restrict downward movement of mobile support platform 62. Alternatively, each support leg 76 may be removed entirely from primary support structure 16. Once support legs 76 no longer restrict downward movement of mobile support platform 62, actuator 98 may be used to lower mobile support platform 62 and gas fuel module 58 from the elevated, first position to the lowered, second position. When gas fuel module 58 is in the lowered, second position, one or more sections of GTE 12 may be moved laterally into, and then through the physical space previously occupied by gas fuel module 58.

Figure 5:
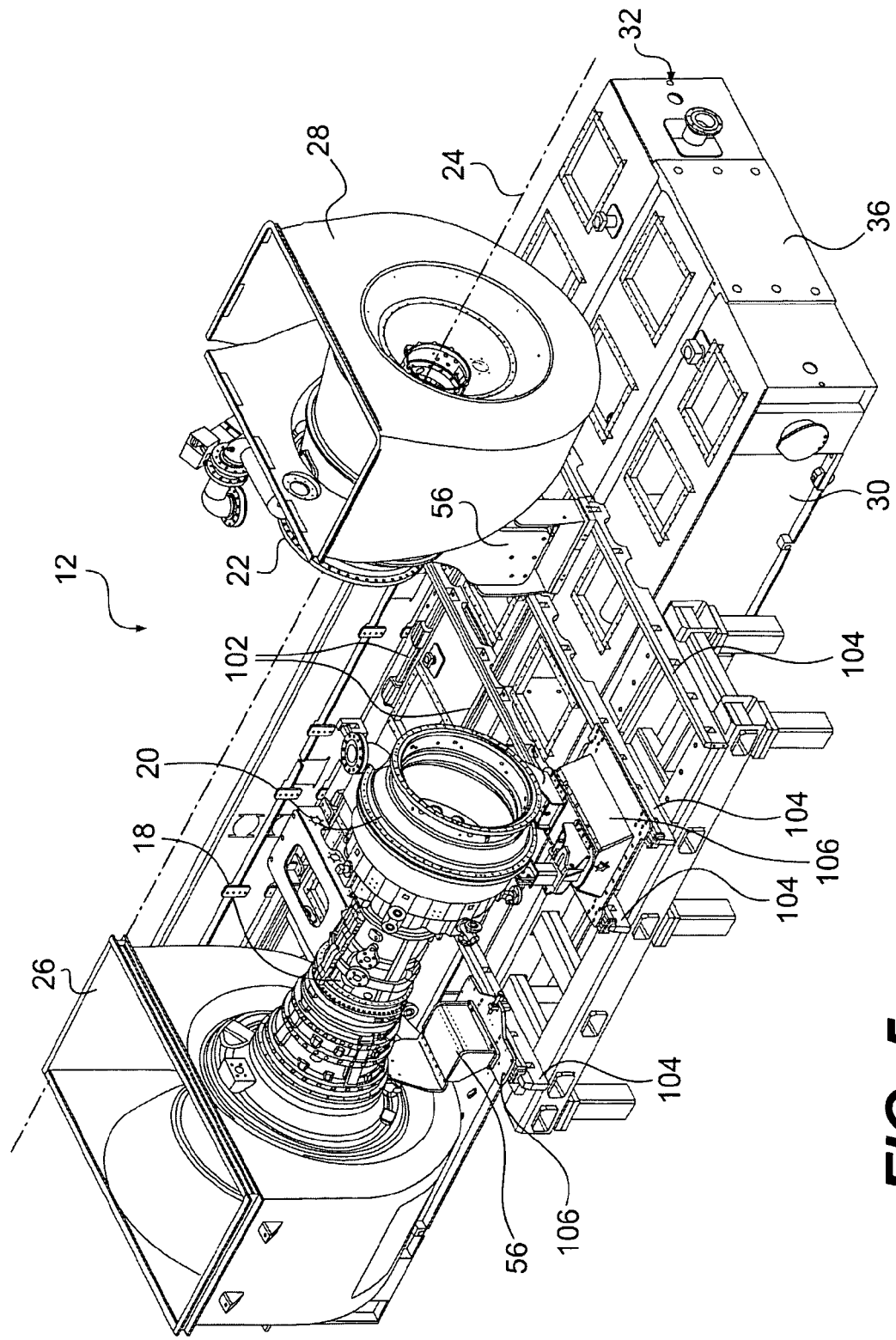
FIG. 5 shows the exemplary power system of FIG. 1 with the GTE in a different position.

One or more sections of GTE 12 (e.g., compressor section 18 and combustor section 20) may be separated from a neighboring section (e.g., turbine section 22) by disconnecting fasteners and moving one or more sections longitudinally on longitudinal GTE guide rails 102. Once the one or more sections of GTE 12 are separated longitudinally from neighboring sections and gas fuel module 58 is in the lowered, second position, secondary support structure 100 may be moved into position adjacent first side wall 30. Further, lateral GTE guide rails 104 may be mounted on primary support structure 16 and secondary support structure 100. Lateral GTE guide rails 104 in combination with GTE sliders 106 may be utilized to substantially aid lateral movement of one or more sections of GTE 12 to pass over gas fuel module 58 when gas fuel module 58 is lowered at least partially into auxiliary component chamber 52 in the second position (FIG. 5). When one or more sections of GTE 12 are positioned on secondary support structure 100, the one or more sections of GTE 12 may be removed for service or repair, for example, by a hoist or a cart (not shown).

While operation of mobile platform system 60 is described and shown moving from the operation configuration to the service configuration for disassembly, mobile platform system 60 may also be utilized to provide clearance for reassembly of one or more sections of GTE 12 onto primary support structure 16. After the one or more sections of GTE 12 are reassembled on primary support structure 16, gas fuel module 58 may be raised from the lowered, second position to the elevated, first position with the aid of actuator 98. Support legs 76 may be reinstalled to at least partially support mobile support platform 62 in the elevated, first position. Finally, any mechanical and/or electrical connections that were previously disconnected between gas fuel module 58 and GTE 12 during disassembly may be reconnected for reassembly.

Power system 10 may be efficiently serviced by implementing a mobile support platform 62 to permit easily moving an auxiliary component 14 mounted thereon from a first position obstructing lateral movement of one or more sections of GTE 12 to a second position providing vertical clearance for lateral movement of one or more sections of GTE 12. Thus, utilizing mobile platform system 60 may reduce labor and time associated with removing one or sections of GTE 12 for service while providing auxiliary component 14 in a convenient location during operation.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for moving an auxiliary component of a gas turbine engine, comprising:
    a support structure to support the gas turbine engine;
    a mobile support platform, disposed at least partially within the support structure, to support the auxiliary component during operation of the gas turbine engine;
    at least one guide assembly operably connected to the mobile support platform to guide movement of the mobile support platform; and
    a drive assembly operably connected to the mobile support platform to impart movement of the mobile support platform between an elevated position and a lowered position.

2. The system of claim 1, wherein the mobile support platform includes at least one temporary support for supporting the mobile support platform in the elevated position, and the at least one temporary support is moveable to permit the mobile support platform to move to the lowered position.

3. The system of claim 2, wherein the at least one temporary support includes a support leg, and the support leg includes a pivot bracket permitting movement of the support leg.

4. The system of claim 1, wherein the auxiliary component includes a fuel module.

5. The system of claim 4, wherein the fuel module includes at least two subcomponents selected from a group including a pump, a valve, a gauge, a controller and a fuel conduit.

6. The system of claim 1, wherein each of the at least one guide assembly includes:
    a guide rail; and
    at least one slider attached to the mobile support platform to move along the guide rail.

7. The system of claim 6, wherein each guide rail includes fasteners to fasten the guide rail to a structure supporting the gas turbine engine.

8. The system of claim 1, wherein the drive assembly includes either a ball screw jack or a scissor jack.

9. The system of claim 8, wherein the drive assembly is driven by an actuator selected from an electrical actuator, a hydraulic actuator, or a pneumatic actuator.

10. A method of moving one or more sections of a gas turbine engine, the method comprising:
    moving an auxiliary component supported on a mobile support platform between a first position and a second position, the auxiliary component at least partially occupying a first space when in the first position; and
    moving the one or more sections of the gas turbine engine into the first space, previously at least partially occupied by the auxiliary component, when the auxiliary component is in the second position.

11. The method of claim 10, wherein the first position is an elevated position and the second position is a lowered position.

12. The method of claim 11, wherein moving the auxiliary component includes moving at least one temporary support that at least partially supports the mobile support platform in the elevated position to permit movement of the mobile support platform to the lowered position.

13. The method of claim 10, wherein the auxiliary component is a fuel module, and moving the fuel module further includes disconnecting at least one subcomponent of the fuel module from the gas turbine engine.

14. The method of claim 10, wherein moving the auxiliary component further includes guiding movement of the mobile support platform with a guide assembly, and imparting movement of the mobile support platform with a drive assembly.

15. The method of claim 10, wherein moving the one or more sections of the gas turbine engine includes positioning at least one gas turbine engine guide rail lateral to the gas turbine engine, and moving the at least one section of the gas turbine engine laterally over the auxiliary component on the gas turbine engine guide rails.

16. The method of claim 10, further including supporting the auxiliary component on the mobile support platform when the gas turbine engine is operating.

17. A power system, comprising:
    a support structure including an upper plane;
    a gas turbine engine, the gas turbine engine being mounted on the support structure;
    at least one auxiliary component; and
    a mobile platform system disposed at least partially within the support structure including:
        a mobile support platform supporting the auxiliary component;
        a guide assembly for guiding movement of the mobile support platform and the auxiliary component; and
        a drive assembly for moving the mobile support platform and the auxiliary component along the guide assembly between a first position, where the auxiliary component is disposed at least partially above the upper plane of the support structure, and a second position, where the auxiliary component is disposed at least partially below the upper plane of the support structure, to provide clearance for lateral movement of the at least one section of the gas turbine engine.

18. The power system of claim 17, wherein the at least one section of the gas turbine engine includes at least one of a compressor section, a combustor section, or a turbine section.

19. The power system of claim 17, wherein the at least one auxiliary component includes at least one of a gas fuel module or a liquid fuel module.

20. The power system of claim 17, wherein the guide assembly includes at least one guide rail engaged to at least one slider, and the drive assembly includes a lift mechanism selected from one of a ball screw jack and a scissor jack.

21. A system for moving an auxiliary component of a gas turbine engine, comprising:
   a mobile support platform supporting the auxiliary component during operation of the gas turbine engine;
   at least one guide assembly operably connected to the mobile support platform to guide movement of the mobile support platform; and
   a drive assembly operably connected to the mobile support to impart movement of the mobile support platform between an elevated position and a lowered position, the mobile support platform being in the elevated position during operation of the gas turbine engine and in the lowered position while the gas turbine engine is not operating.

22. The system of claim 21, wherein the mobile support platform includes at least one temporary support for supporting the mobile support platform in the elevated position, and the at least one temporary support is moveable to permit the mobile support platform to move to the lowered position.

23. The system of claim 22, wherein the at least one temporary support includes a support leg, and the support leg includes a pivot bracket permitting movement of the support leg.

24. The system of claim 21, wherein the auxiliary component includes a fuel module.

25. The system of claim 24, wherein the fuel module includes at least two subcomponents selected from a group including a pump, a valve, a gauge, a controller and a fuel conduit.

26. The system of claim 21, wherein each guide assembly includes:
   a guide rail; and
   at least one slider attached to the mobile support platform to move along the guide rail.

27. The system of claim 26, wherein each guide rail includes fasteners to fasten the guide rail to a structure supporting the gas turbine engine.

28. The system of claim 21, wherein the drive assembly includes either a ball screw jack or a scissor jack.

29. The system of claim 28, wherein the drive assembly is driven by an actuator selected from an electrical actuator, a hydraulic actuator, or a pneumatic actuator.

* * * * *

UNITED STATES PATENT AND TRADEMARK OFFICE
CERTIFICATE OF CORRECTION

| | | |
|---|---|---|
| PATENT NO. | : 8,621,873 B2 | Page 1 of 1 |
| APPLICATION NO. | : 12/318400 | |
| DATED | : January 7, 2014 | |
| INVENTOR(S) | : Robertson et al. | |

It is certified that error appears in the above-identified patent and that said Letters Patent is hereby corrected as shown below:

In the Specification

Column 5, line 32, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*